(No Model.)
W. ELLIOTT.
PARIS GREEN DISTRIBUTER.
No. 280,157. Patented June 26, 1883.
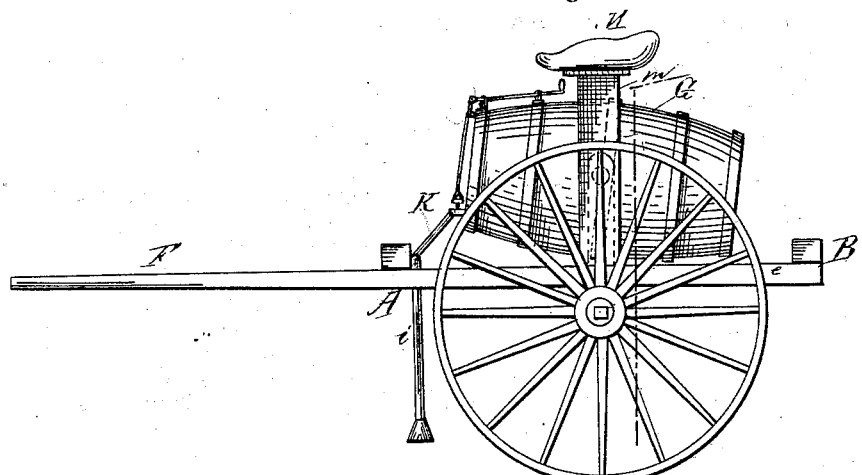
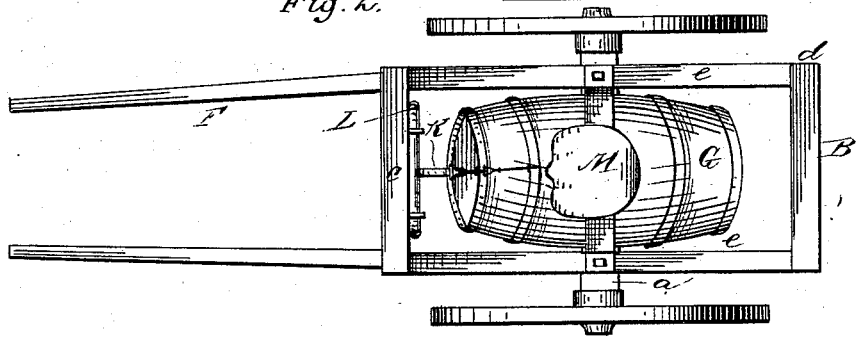
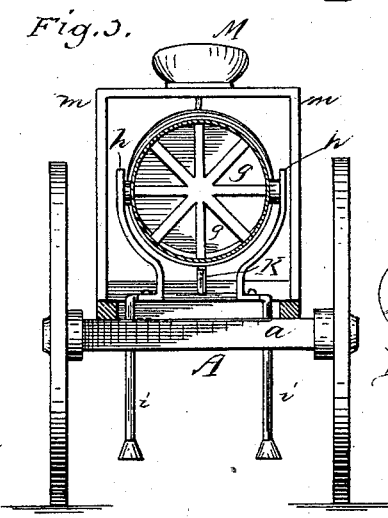
William Elliott
Inventor
Witnesses
Attorney

United States Patent Office.

WILLIAM ELLIOTT, OF EVANS, COLORADO.

PARIS-GREEN DISTRIBUTER.

SPECIFICATION forming part of Letters Patent No. 280,157, dated June 26, 1883.

Application filed February 8, 1883. (No model.)

*To all whom it may concern:*

Be it known that I, WILLIAM ELLIOTT, a citizen of the United States of America, residing at Evans, in the county of Weld and State of Colorado, have invented certain new and useful Improvements in Paris-Green Distributers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an apparatus for sprinkling paris-green or other poisonous substance mixed with water upon growing plants for the purpose of destroying insects—such as the potato bug and the like.

The object of the invention is to keep the mixture well stirred up while being carried about in a reservoir for distribution, and to facilitate the sprinkling of the mixture upon the plants; and to this end my improvement consists in certain novel combinations of devices, which will be hereinafter particularly described, and pointed out in the appended claims.

In the accompanying drawings, Figure 1 is a side elevation of an apparatus constructed according to my invention. Fig. 2 is a top view of the same, and Fig. 3 a rear elevation.

A is the carriage of the apparatus, and B an open frame carried thereby, and consisting of the front bar, c, rear bar, d, and side bars, as at e, said side bars being prolongations of the shafts F.

G indicates a barrel-shaped reservoir, which is pivoted, about midway its length, between two spring-arms, h h, rising from the axle a. At its forward end this barrel is provided with a discharge-spout, i, provided with a stop-cock, and connected by a flexible hose, K, with a pipe, L, which is carried by the front bar, c, and has downwardly-projecting ends provided with rose-heads for sprinkling the mixture.

Within the barrel or reservoir are preferably arranged cross-bars g, which assist in stirring up the mixture.

M is a driver's seat mounted on a cross-bar supported by suitable standards, m, rising from the side bars, and from this seat an operating-rod extends to the handle of the stop-cock in spout i, so that the driver on his seat may open or close the stop-cock, as desired. The stop-cock, which forms the connecting means between the barrel or tank and the flexible hose K, is provided with an upwardly-extending rod, which is secured to the edge of the tank at one end and to the turn-button of the stop-cock at the other end, and to the top of the barrel, extending rearwardly toward the driver's seat, is a rod with an operating-handle, as shown in Fig. 1. These vertical and horizontal rods are connected to each other by a universal joint, so that when the handle is turned the valve of the stop-cock will be rotated.

The operation of the apparatus is as follows: The barrel or reservoir is first filled with a suitable quantity of a mixture of water and paris-green, or other powdered insect-poison, and the stop-cock being then closed the apparatus may be driven to the field where it is to be used and placed between two rows of plants, with one of the sprinkling or rose heads over each row. The driver may then open his stop-cock and start his team, and during his progress over the space between the two rows the motion of the carriage will give an oscillating and springy vibratory motion to the pivoted reservoir, causing the mixture within the same to be thoroughly agitated and the powdered substance to be well distributed through the liquid, said liquid being conducted by the hose K to the cross-pipe L, to each end of which it flows and makes its exit through the rose-heads, whence it falls upon the plants.

I am aware that reservoirs have been mounted on carriages and provided with sprinkling-pipes for distributing insect-poison and for other purposes; and I do not claim such an apparatus, broadly.

What I claim is—

1. The combination, with a suitable carriage, of a reservoir pivoted thereon to have a vertical oscillating motion, and a suitable distributing pipe or pipes connected with said reservoir, substantially as and for the purpose set forth.

2. The combination, with the carriage having the frame B, of the reservoir G, pivoted on suitable arms rising from the axle, the cross-pipe L, having the depending ends provided with rose-heads, and the flexible hose connecting the reservoir with said cross-pipe, substantially as described.

In testimony whereof I affix my signature in presence of two witnesses.

WILLIAM ELLIOTT.

Witnesses:
N. H. TALBOT,
GEO. H. HOWE.